United States Patent
White et al.

(10) Patent No.: US 7,651,059 B2
(45) Date of Patent: Jan. 26, 2010

(54) CABLE DROP SUPPORT SYSTEMS FOR USE WITH ELEVATED STRUCTURES

(75) Inventors: Isaac D. White, Groveland, FL (US); James E. Dickens, Ocoee, FL (US)

(73) Assignee: AT&T Intellectual Property I, L.P., Reno, NV (US)

(*) Notice: Subject to any disclaimer, the term of this patent is extended or adjusted under 35 U.S.C. 154(b) by 99 days.

(21) Appl. No.: 10/737,299

(22) Filed: Dec. 16, 2003

(65) Prior Publication Data

US 2005/0127246 A1 Jun. 16, 2005

(51) Int. Cl.
  *F16M 11/00* (2006.01)
  *E04G 1/00* (2006.01)
  *E04B 1/00* (2006.01)

(52) U.S. Cl. .......... 248/125.8; 52/122.1; 182/2.2; 182/2.11; 248/121; 254/2 R; 254/124

(58) Field of Classification Search .......... 248/125.1, 248/125.2, 125.8, 127, 132, 157, 161, 423, 248/188.5, 121, 295.11, 219.2; 343/713, 343/883, 880; 362/385, 419; 182/69.6, 2.2, 182/2.1, 2.8, 2.9, 2.11, 115, 146, 141; 52/117, 52/118, 122.1; 254/2 R, 124, 4 R, 341, 342, 254/264; 342/880, 883, 901
See application file for complete search history.

(56) References Cited

U.S. PATENT DOCUMENTS

| | | | | |
|---|---|---|---|---|
| 4,081,055 A | * | 3/1978 | Johnson | 182/2.8 |
| 4,309,708 A | * | 1/1982 | Sayovitz | 343/713 |
| 4,748,451 A | * | 5/1988 | Edwards | 343/880 |
| 5,101,215 A | * | 3/1992 | Creaser, Jr. | 343/883 |
| 5,107,954 A | * | 4/1992 | Fujimoto | 182/2.11 |
| 5,113,768 A | * | 5/1992 | Brown | 104/112 |
| 5,568,205 A | * | 10/1996 | Hurwitz | 348/723 |
| 5,868,218 A | * | 2/1999 | Lawson | 182/69.6 |
| 6,042,080 A | * | 3/2000 | Shepherd et al. | 248/683 |
| 6,158,555 A | * | 12/2000 | Brown, Jr. | 187/414 |
| 6,206,613 B1 | * | 3/2001 | Elkins | 405/157 |
| 6,253,502 B1 | * | 7/2001 | Layton | 52/118 |
| 6,290,377 B1 | * | 9/2001 | Hulse | 362/385 |
| 6,644,601 B2 | * | 11/2003 | Aussiker | 248/49 |
| 6,709,172 B2 | * | 3/2004 | Brown | 396/427 |

FOREIGN PATENT DOCUMENTS

AU 200223231 A * 3/2003

* cited by examiner

*Primary Examiner*—Amy J Sterling
*Assistant Examiner*—Tan Le
(74) *Attorney, Agent, or Firm*—Scott P. Zimmerman PLLC (57) ABSTRACT

In various embodiments, a cable drop support system is provided including a base adapted for attachment to a surface; at least one segment connected to the base; and, a cable receptacle attached to a portion of the at least one segment, the cable receptacle being structured for receiving therein at least a portion of a cable.

8 Claims, 6 Drawing Sheets

CABLE DROP SUPPORT SYSTEMS FOR USE WITH ELEVATED STRUCTURES

BACKGROUND

The subject invention generally and in various embodiments relates to devices for supporting objects such as cables, for example, used in connection with work performed on elevated structures.

In many commercial and industrial settings, work sites may include utility structures or other elevated structures. Scaling such elevated structures is often required by workers performing maintenance, installation and/or other related functions on equipment located at the work site. In elevated work environments, it may be difficult for workers to manipulate work tools, work materials and/or cables, while also maintaining a reasonably stable physical position.

Figure 1:
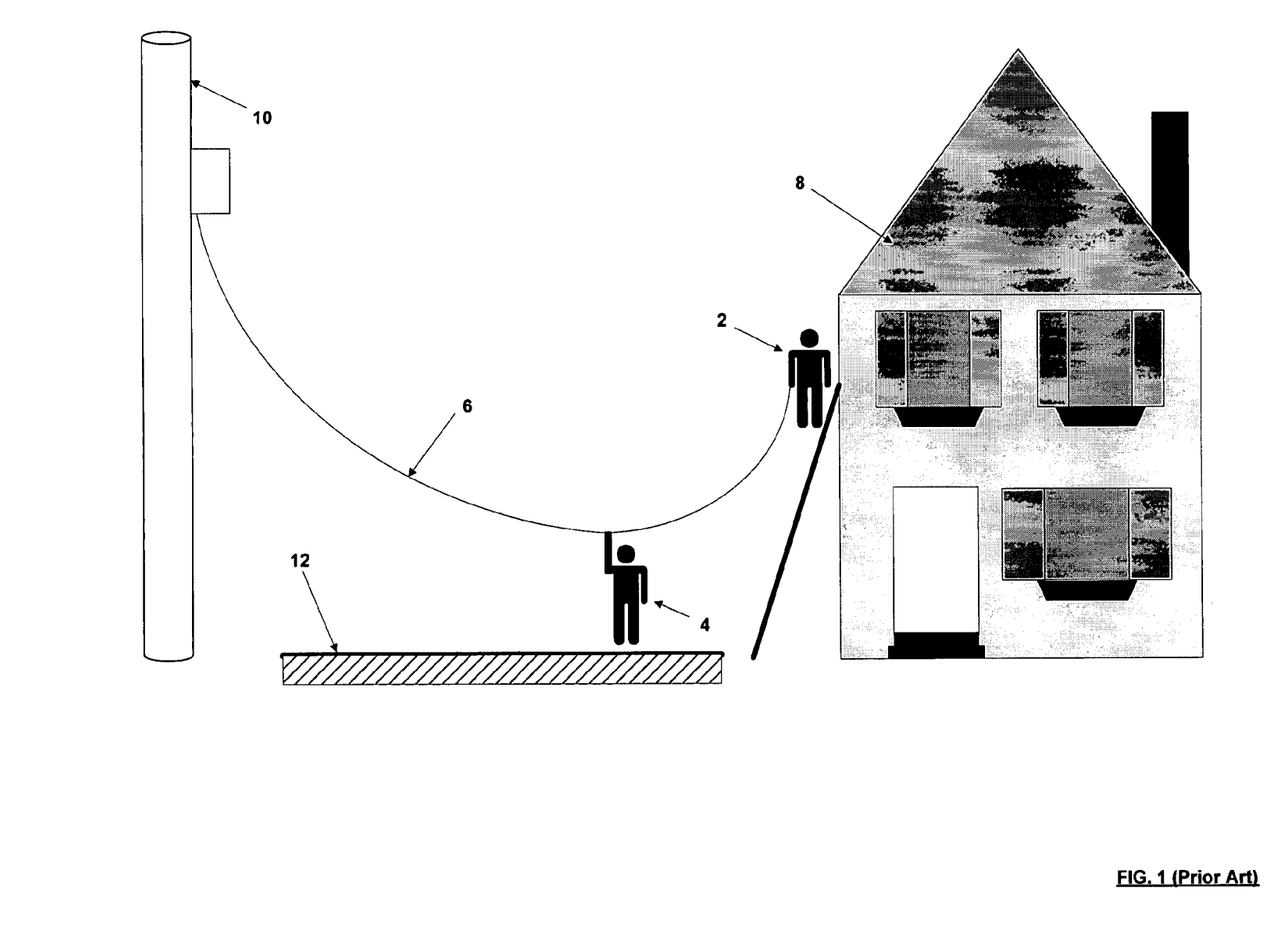
FIG. 1 includes a schematic illustrating a prior art method for performing cable installation between elevated structures.

In certain situations, service technicians may work aloft on elevated structures to perform installation or maintenance duties on aerial cables and utility poles, for example. With reference to the scenario shown in FIG. 1, for example, two service technicians 2, 4 collaborate to attach a cable 6 between first and second elevated structures 8, 10. The first elevated structure 8 may be a residential home, for example, and the second elevated structure 10 may be a utility pole. As shown, one end of the cable 6 is attached to the utility pole 10 and the other end of the cable 6 is held by the first service technician 2 in position next to the home 8. It can be seen that the second service technician 4 is needed to support a portion of the cable 6 which, due to its weight, sags toward a street 12 located between the home 8 and the utility pole 10. The second service technician 4 supports the cable 6 to enable the first service technician 2 to connect the cable 6 to the home 8. In addition to supporting the cable 6, the second service technician 4 is needed to direct traffic on the street 12, for example, and/or to address other street 12 conditions that are impacted by installation of the cable 6.

It can be appreciated that commercial entities and other organizations that employ workers in elevated environments are aware of the potential risks attendant upon work performed in such environments. Commercial entities therefore devote substantial time and resources to promote safe conditions for work performed in elevated environments. Promoting worker safety may involve instituting intensive training programs and/or providing a variety of support devices, support systems, backup devices and systems, and/or other strategies for promoting the stability and safety of workers. Despite the best efforts of entities to enhance the safety of their workers and reduce the risks presented by tools, work materials, or other objects potentially descending from elevated structures, however, it is nonetheless difficult to eliminate all risks to workers in elevated environments.

Based on the foregoing discussion, it can be seen that improved devices are needed for supporting objects such as cables, for example, in association with work performed on elevated structures.

SUMMARY

In embodiments of the present invention, a cable drop support system is provided. The cable drop support system includes a base adapted for attachment to a surface; at least one segment connected to the base; and, a cable receptacle attached to a portion of the at least one segment, the cable receptacle being structured for receiving therein at least a portion of a cable.

In other embodiments of the present invention, a cable drop support system is provided. The cable drop support system includes a base adapted for attachment to a surface, wherein the attachment surface includes a surface area portion of a service vehicle; a first segment connected to the base; at least a second segment attached to the first segment, the first and second segments being structured in a telescoping configuration; and, a cable receptacle attached to a portion of at least one of the segments, the cable receptacle being structured for receiving therein at least a portion of a cable, the cable receptacle including a generally upwardly open U-shaped configuration.

In other embodiments of the present invention, a cable drop support system is provided. The cable drop support system includes a base adapted for attachment to a surface, wherein the attachment surface includes a surface area portion of a service vehicle; a first segment connected to the base; at least a second segment attached to the first segment, the first and second segments being structured in a telescoping configuration; a cable receptacle attached to a portion of at least one of the segments, the cable receptacle being structured for receiving therein at least a portion of a cable, the cable receptacle including a generally upwardly open U-shaped configuration; and, at least one control system operatively associated with the cable drop support system, the control system configured for receiving instructions communicated through at least one communication media from at least one communication device, wherein the communication device is selected from the group consisting of a remote control device, a laptop, a personal digital assistant, and a telephone.

Other systems, methods, and/or products according to embodiments of the present invention will be or will become apparent to one with skill in the art upon review of the following drawings and detailed description. It is intended that all such additional systems, methods, and/or products be included within this description, be within the scope of the invention, and be protected by the accompanying claims.

DESCRIPTION

As used herein, the term "elevated structure" includes, for example and without limitation, telephone poles and other utility structures for supporting utility related equipment and services such as, for example, telephone services, Internet services, electricity services and/or television/cable services; as well as scaffolding, radio towers, oil rigs, buildings, residences, construction sites for buildings and other erections, structures that require elevation of a worker, and/or any other elevated structure suitable for use in association with various embodiments of the invention.

As used herein, the term "cable" includes, for example and without limitation, metal wire (e.g., copper wire), telephone line, fiber optic cable, telecommunications cable, electrical transmission/distribution lines, lines for promoting support of elevated structures (e.g., guide wires), and/or any other type of cable suitable for application to one or more aspects of the present invention, such as a cable attached to an elevated structure, for example.

As used herein, the term "service vehicle" includes a truck, a van, a car, and/or any other vehicle, whether mobile or stationary, that can be adapted for use in association with various embodiments of the present invention. In certain embodiments, for example, a suitable service vehicle includes an appropriate surface or surfaces for mounting a cable drop support system structured in accordance with the present invention.

Figure 2:
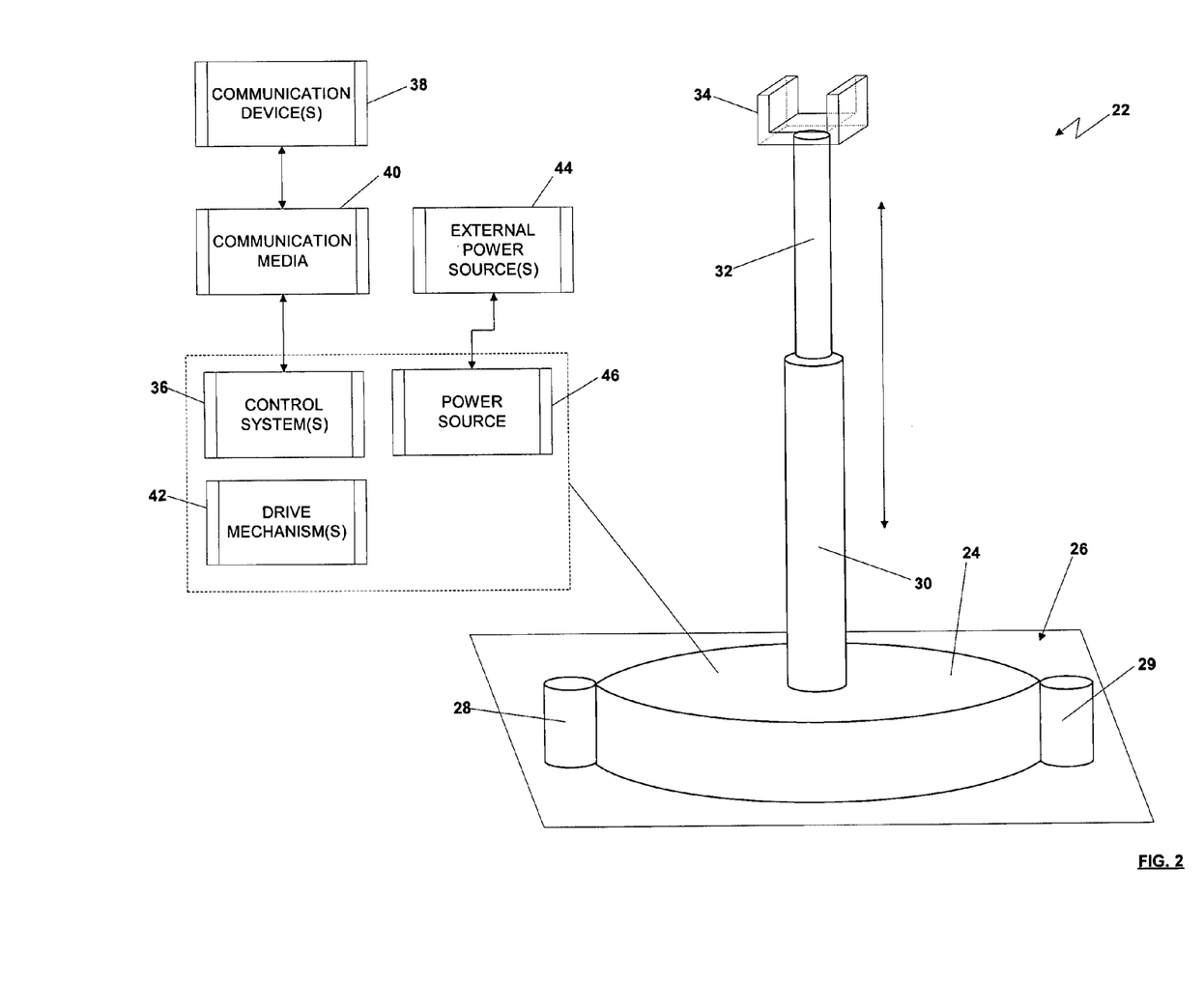
FIG. 2 includes a partially schematic, partially isometric view of embodiments of support systems provided in accordance with the present invention.
Figure 3:
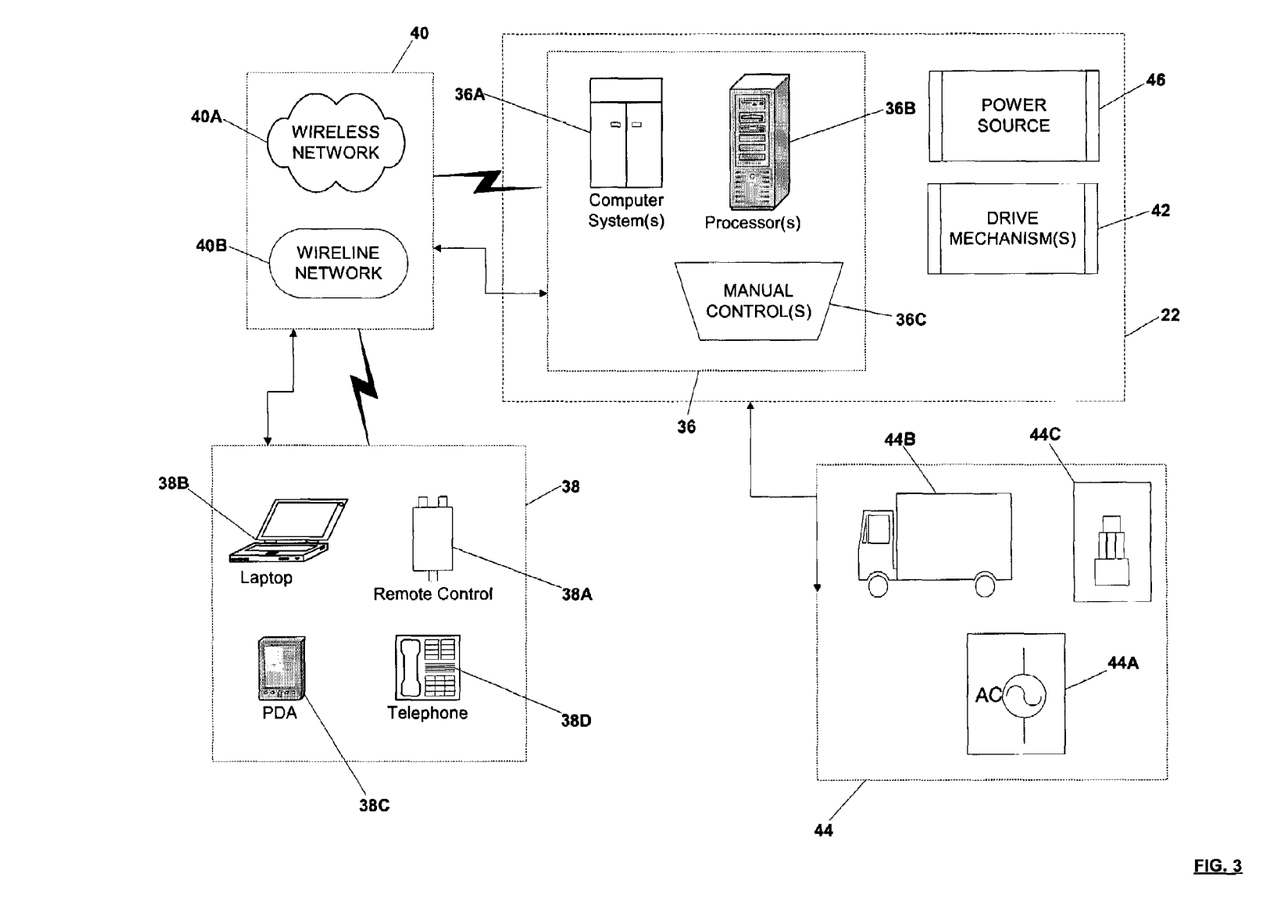
FIG. 3 includes schematic representations that provide details of various aspects of the embodiments of FIG. 2.

Referring now to FIGS. 2 and 3, various embodiments of a cable drop support system 22 are shown in accordance with the present invention. The cable drop support system 22 includes a base 24 that is adapted for attachment to a surface 26 that, in various aspects, includes a surface area portion of a service vehicle (not shown), for example. The base 24 includes one or more attachment devices such as bolt housings 28, 29, for example, to permit the base 24 to be removably attached or substantially permanently attached to the surface 26. It can be appreciated that removable attachment of the base 24 to the surface 26 permits portability and transportation of the cable drop support system 22 between/among different service locations, for example. It can be appreciated that the base 24 can be attached to the surface 26 with bolts, screws, adhesives, welds and/or any other suitable attachment devices.

In various embodiments of the invention, at least a first segment 30 is removably or substantially permanently connected to the base 24. In certain aspects, at least a second segment 32 extends from the first segment 30 to provide a series of consecutive segments 30, 32 that offers an enhanced overall extension length for the cable drop support system 22. It can be appreciated that more than two segments can be suitably employed in various embodiments of the present invention to provide an overall extension length for the cable drop support system 22. In other aspects, a cable receptacle 34 is attached to a portion of the final segment 32 in the series of consecutive segments 30, 32. In various embodiments, the cable receptacle 34 includes a generally upwardly open U-shaped configuration structured for receiving and supporting therein at least a portion of a cable (not shown).

In other embodiments of the present invention, the cable drop support system 22 includes one or more control systems 36 for receiving instructions from one or more communication devices 38 through one or more different kinds of communication media 40. The control systems 36 include conventional hardware and/or software configured for receiving instructions and directing the functions of one or more drive mechanisms 42, for example, installed within the base 24 of the cable drop support system 22. Examples of the control systems 36 include, without limitation, one or more computer systems 36A, one or more processors 36B, and/or one or more manual controls 36C, among other types of suitable control systems 36. In certain aspects, the segments 30, 32 are structured/dimensioned in a telescoping configuration (as shown in FIG. 2) to permit at least a portion of the final segment 32 to extend from or collapse into the preceding segment 30 of the series of segments 30, 32 during operation of the cable drop support system 22. In various embodiments, the extension or collapse of the telescoping segments 30, 32 is enabled by the function of the drive mechanisms 42, which include gears and/or other appropriate mechanical components structured/configured to enable the telescoping action of the segments 30, 32.

In various aspects, the communication devices 38 include, for example and without limitation, a remote control device 38A, a laptop 38B, a personal digital assistant ("PDA") 38C, and/or a telephone 38D (e.g., a wireless, cellular or wireline telephone), among other types of suitable communication devices 38. The communication devices 38 can communicate with one or more of the control systems 36 through the communication media 40. The communication media 40 include, for example and without limitation, a wireless network 40A and/or a wireline network 40B. In one operational example, the cable drop support system 22 can be installed in a substantially collapsed state. In this example, a service technician activates the PDA 38C to communicate through the wireless network 40A with the computer system 36A. The computer system 36A receives commands input by the service technician through the PDA 38C and directs the drive mechanism 42 to activate and initiate the telescoping function of the segments 30, 32. In this manner, the service technician can control extension and/or collapse of the segments 30, 32 from a location that is remote with respect to the position of the cable drop support system 22.

In addition, in various aspects, one or more external power sources 44 can be operatively associated with a power source 46 of the cable drop support system 22 to supply power for various functions of the cable drop support system 22. The power sources 44 include, for example and without limitation, a conventional AC power source 44A (e.g., an electrical outlet located at or near the work site), a service vehicle 44B (e.g., a battery of the service vehicle can be used as a power source), and/or a generator 44C (such as a gas-powered electric generator, for example) which may be portable or substantially fixed at the work site, among other suitable types of power sources 44. In various aspects, the power source 46 of the cable drop support system 22 includes a conventional, rechargeable battery that does not require one of the external power sources 44 to supply power to the components of the cable drop support system 22.

Figure 4:
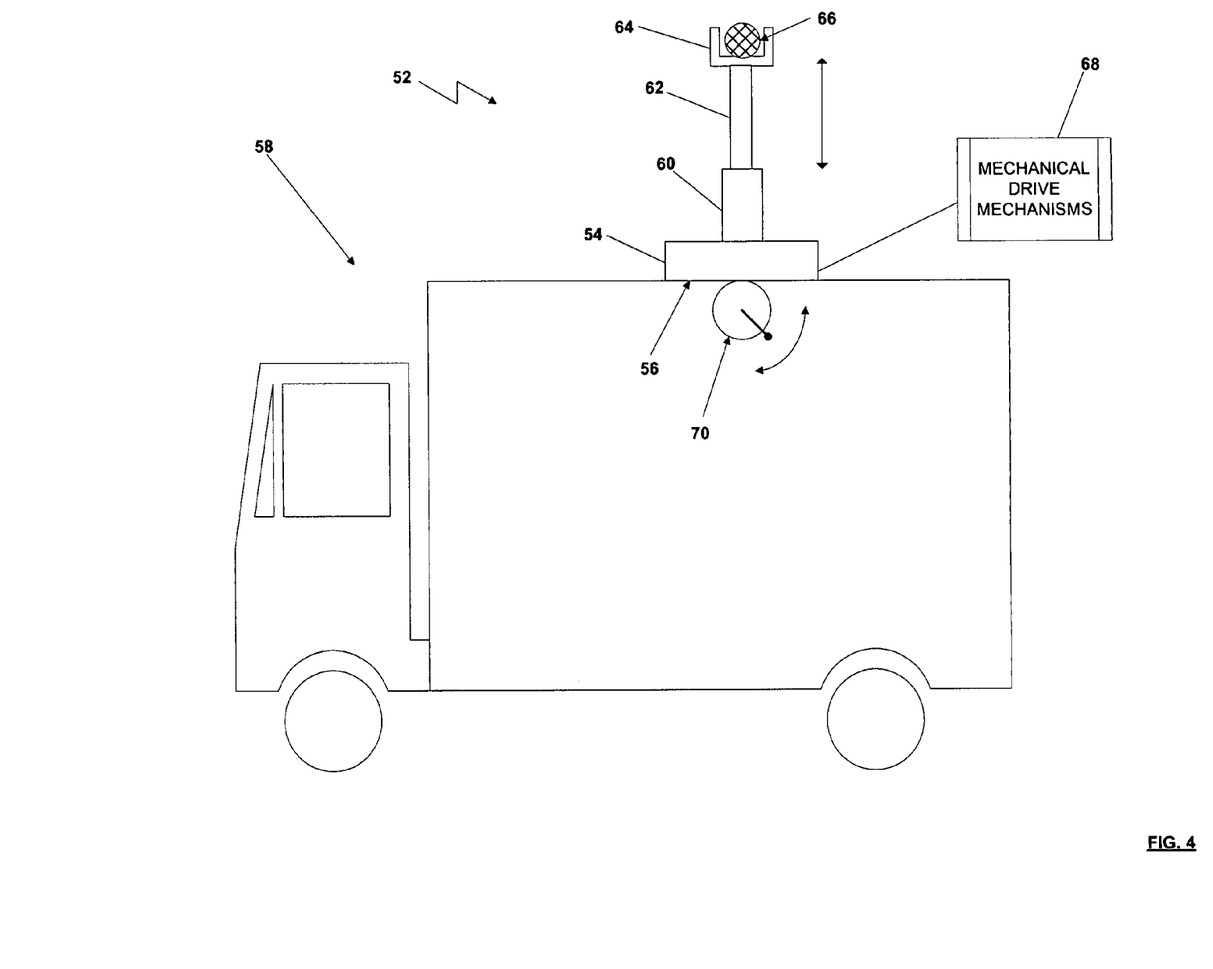
FIG. 4 includes a schematic representation of embodiments of support systems provided in accordance with the present invention.

Referring now to FIG. 4, in various embodiments of the present invention, a cable drop support system 52 includes a base 54 mounted to a surface area portion 56 of a service vehicle 58. The cable drop support system 52 includes a series of segments comprising at least first and second operatively associated telescoping segments 60, 62. In various aspects, the final telescoping segment 62 in the series of segments is connected to a cable receptacle 64. In other aspects, the cable receptacle 64 includes a generally upwardly open U-shaped configuration structured for receiving and supporting therein at least a portion of a cable 66. The cable drop support system 52 includes one or more mechanical drive mechanisms 68 such as, for example, gears, chains, belts, ball bearings, and/or other like components operatively associated with a hand crank 70, for example. It can be appreciated that the mechanical drive mechanisms 68 and the hand crank 70 are configured to work in conjunction (e.g., through manual or automated rotation/cranking of the hand crank 70) to enable the telescoping function of the segments 60, 62. It can be seen that the extension of the segments 60, 62 provides an extended length between the cable receptacle 64 and the surface area portion 56 of the service vehicle 58.

Figure 5:
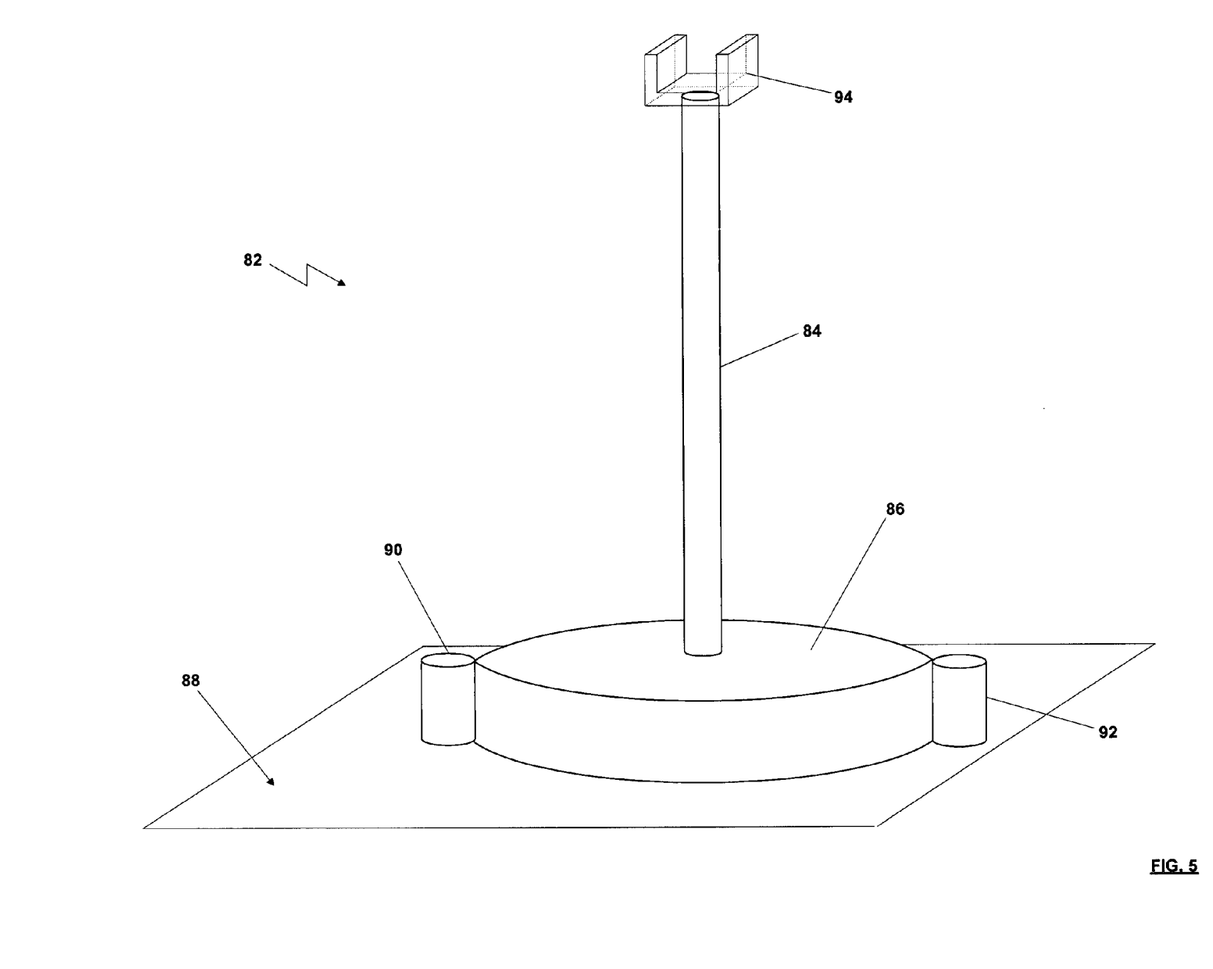
FIG. 5 includes an isometric view illustrating embodiments of support systems provided in accordance with the present invention; and, FIG. 6 includes a schematic illustrating various embodiments of support systems and methods for employing support systems to install cable between elevated structures in accordance with the present invention.

Referring now to FIG. 5, in other embodiments of the present invention, a cable drop support system 82 includes a substantially stationary segment 84 that is removably or substantially permanently attached to a base 86. The base 86 is adapted for attachment to a surface 88 that, in various aspects, includes a surface area portion of a service vehicle (not shown), for example. In certain aspects, the base 86 includes one or more attachment devices such as bolt housings 90, 92 for example, to permit the base 86 to be removably or substantially permanently attached to the surface 88. It can be appreciated that removable attachment of the base 86 to the surface 88 permits portability and transportation of the cable drop support system 82 between/among different service locations, for example. It can be appreciated that the base 86 can be attached to the surface 88 with bolts, screws, adhesives, welds and/or any other suitable attachment devices. In various aspects, a cable receptacle 94 is attached to a portion of the stationary segment 84. In certain aspects, the cable receptacle 94 includes a generally upwardly open U-shaped configuration structured for receiving and supporting at least a portion of a cable (not shown) therein.

Figure 6:
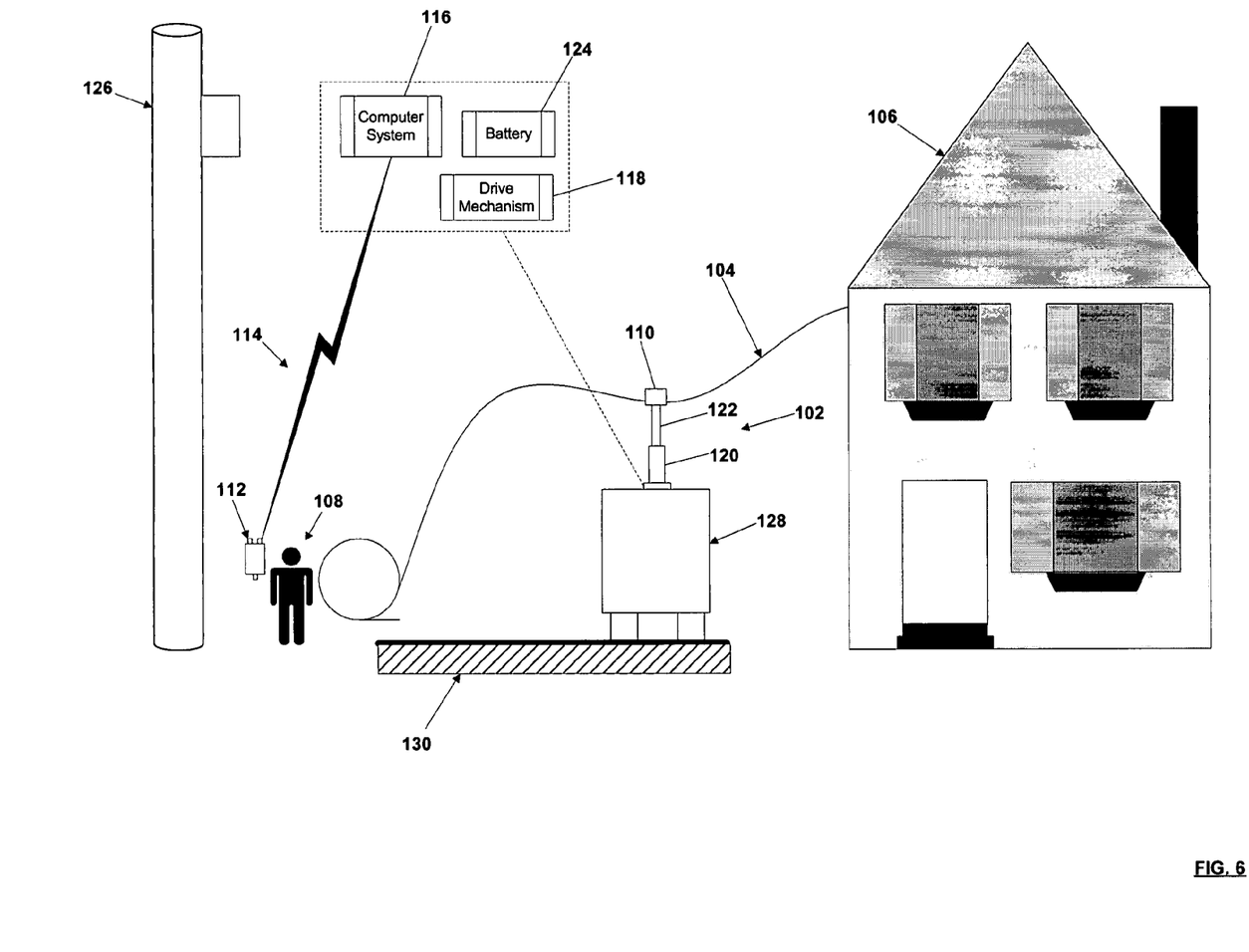

Referring now to FIG. 6, an operational example illustrating use of a cable drop support system 102 in accordance with the present invention is provided. A first end of a cable 104 is attached to a first elevated structure 106 (e.g., a residence where telecommunications services are to be provided) by a service technician 108. Once the first end of the cable 104 is attached to the first elevated structure 106, the service technician 108 places a portion of the cable 104 into a cable receptacle 110 of the cable drop support system 102 in a collapsed or substantially collapsed position of the cable drop support system 102, for example. The service technician 108 then activates a remote control device 112 that communicates instructions through a wireless medium 114 to a computer system 116 operatively associated with the cable drop support system 102. The computer system 116 instructs a drive mechanism 118 to extend telescoping segments 120, 122 of the cable drop support system 102 (along with the portion of the cable 104 supported on the cable receptacle 110) into an extended position as shown in FIG. 6. In this example, the drive mechanism 118 includes a variety of conventional mechanical components that effect the telescoping action of the segments 120, 122 to provide the extended position. The drive mechanism 118 and the computer system 116 draw power from an internal battery power source 124 of the cable drop support system 102.

Once the cable 104 is raised through the telescoping action of the segments 120, 122, the service technician 108 can transport the balance of the cable 104 to a location on a second elevated structure 126 (e.g., a utility pole including access points for various telecommunications services) to complete the connection between the elevated structures 106, 126. It can be seen that the cable drop support system 102 reduces the need for the service technician 108 to enlist the assistance of a second service technician, for example, to perform work (e.g., direct traffic or support a portion of the cable 104) between the two elevated structures 106, 126. In one aspect, a service vehicle 128 functions on a street 130, for example, or other thoroughfare or obstacle between the elevated structures 106, 126, in place of a potential second service technician.

It can be appreciated that choice of materials for construction/manufacture of the various structural elements disclosed herein is driven, at least in part, by the motivation to provide system and apparatus embodiments that are relatively lightweight, relatively compact, readily manipulated and structurally sound. It can be further appreciated that such materials can be selected to promote convenience of transportation and manipulation of the various aspects and components of the present embodiments in association with work performed on elevated structures, for example.

The term "computer-readable medium" is defined herein as understood by those skilled in the art. It can be appreciated, for example, that method steps described herein may be performed, in certain embodiments, using instructions stored on a computer-readable medium or media that direct a computer system to perform the method steps. A computer-readable medium may include, for example and without limitation, memory devices such as diskettes, compact discs of both read-only and writeable varieties, digital versatile discs (DVD), optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

As used herein, a "computer" or "computer system" may be, for example and without limitation, either alone or in combination, a personal computer (PC), server-based computer, server, main frame, microcomputer, minicomputer, laptop, personal data assistant (PDA), cellular phone, pager, processor, including wireless and/or wireline varieties thereof, and/or any other computerized device capable of configuration for processing data for either standalone application or over a networked medium or media. Computers and computer systems disclosed herein may include memory for storing certain software applications used in obtaining, processing, storing and/or communicating data. It can be appreciated that such memory may be internal or external, remote or local, with respect to its operatively associated computer or computer system. The memory may also include any means for storing software, including a hard disk, an optical disk, floppy disk, ROM (read only memory), RAM (random access memory), PROM (programmable ROM), EEPROM (extended erasable PROM), and other suitable computer-readable media.

The examples presented herein are intended to illustrate potential implementations of the embodiments of the present invention. It can be appreciated that such examples are intended primarily for purposes of illustration. No particular aspect of the embodiments described herein is intended to limit the scope of the present invention. The configuration and specific functions of a particular cable drop support system, for example, are provided merely for convenience of disclosure.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. Because such elements are well known in the art, however, and because they do not facilitate a better understanding of the present invention, a discussion of such elements is not provided herein.

It can be appreciated that, in some embodiments of the present embodiments, a single component/element can be replaced by multiple components/elements, and multiple components/elements replaced by a single component/element, to perform a given function. Except where such substitution would not be operative to practice the present embodiments, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A cable drop support system comprising:
a base configured for attachment to an attachment surface, the base including at least one attachment device, wherein the attachment device is an adhesive for adhering the base to the attachment surface;
one or more telescopic segments connected to the base that extend and retract in length in a telescoping configuration;
a cable receptacle attached to an end portion of a final segment of the telescopic segments, the cable receptacle having a generally U-shaped cross-section for receiving therein at least an intermediate portion of a cable;
a control system installed in the base and operatively associated with the cable drop support system, the control system receiving instructions communicated through at least one wireless communication media;
a portable communication device providing instructions to the control system through the at least one wireless communication media, the portable communication device is selected from the group consisting of a laptop, a personal digital assistant, and a telephone;
at least one mechanical drive mechanism connected to the final segment of the telescopic segments and operatively coupled to respond to the control system, the at least one mechanical drive mechanism extending and retracting at least the final segment; and
an electric generator power source providing electric power to the cable drop support system to cause extension and retraction of the telescopic segments from the instructions received from the control system.

2. The cable drop support system of claim 1, wherein the one or more telescopic segments include at least a second segment attached to a first segment.

3. The cable drop support system of claim 1, wherein the cable receptacle includes a generally upwardly open U-shaped configuration.

4. The cable drop support system of claim 1, wherein the control system is selected from the group consisting of a computer system, a processor, and a manual control.

5. The cable drop support system of claim 1, wherein the communication media includes at least one of a wireless medium and a wireline medium.

6. The cable drop support system of claim 1, wherein the one or more segments include at least a second segment attached to a first segment.

7. The cable drop support system of claim 1, wherein the one or more segments includes a substantially stationary segment attached to the base.

8. A cable drop support system comprising:
a base including at least one attachment device and having an elliptically shaped cross section with a major diameter that forms opposite pointed ends of an ellipse, wherein the attachment device is an adhesive that adheres the base to an attachment surface, and wherein the attachment surface includes a surface portion area of a service vehicle;
a first segment connected to the base;
at least a second segment attached to the first segment, the first and second segments being structured in a telescoping configuration;
a cable receptacle attached to an end portion of one of the segments, the cable receptacle having a generally upwardly open U-shaped cross-section for receiving therein an intermediate portion of a cable and for supporting the intermediate portion of the cable;
a control system operatively associated with the cable drop support system, the control system comprising a telephone sending instructions over a wireless communications media to cause extension and retraction of the first and second segments;
at least one mechanical drive mechanism connected to the second segment and operatively coupled to respond to the control system, the at least one mechanical drive mechanism extending and retracting the second segment; and
an electric generator power source providing electric power to the cable drop support system to cause extension and retraction of the second segment from the instructions received from the control system.

* * * * *